US008200498B2

(12) United States Patent
LeComte et al.

(10) Patent No.: US 8,200,498 B2

(45) **Date of Patent: *Jun. 12, 2012**

(54) SECURE AUDIO STREAM SCRAMBLE SYSTEM

(75) Inventors: Daniel LeComte, Paris (FR); Daniela Parayre-Mitzova, Paris (FR)

(73) Assignee: Querell Data Limited Liability Company, Dover, DE (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/628,534

(22) Filed: Dec. 1, 2009

(65) Prior Publication Data

US 2010/0076773 A1 Mar. 25, 2010

Related U.S. Application Data

(63) Continuation of application No. 11/092,533, filed on Mar. 29, 2005, now Pat. No. 7,630,492, which is a continuation of application No. PCT/FR03/02913, filed on Oct. 3, 2003.

(30) Foreign Application Priority Data

Oct. 3, 2002 (FR) ..................................... 02 12267

(51) Int. Cl.
*G10L 21/00* (2006.01)
*G06F 17/00* (2006.01)

(52) U.S. Cl. .......................................... 704/500; 380/33

(58) Field of Classification Search .................. 704/500; 380/33

See application file for complete search history.

(56) References Cited

U.S. PATENT DOCUMENTS

| | | | | |
|---|---|---|---|---|
| 5,953,506 | A | 9/1999 | Kalra et al. | |
| 7,290,057 | B2 | 10/2007 | Saunders et al. | |
| 7,630,492 | B2 * | 12/2009 | Lecomte et al. | 380/33 |
| 7,702,103 | B2 * | 4/2010 | Lecomte et al. | 380/217 |
| 2002/0154774 | A1 | 10/2002 | Oomen et al. | |
| 2005/0226408 | A1 | 10/2005 | Hotz | |

FOREIGN PATENT DOCUMENTS

| | | | |
|---|---|---|---|
| DE | 199 07 964 | C1 | 8/2000 |
| EP | 0993142 | A1 | 4/2000 |
| WO | WO-99/55089 | A1 | 10/1999 |
| WO | WO-02/062008 | A2 | 8/2002 |

* cited by examiner

*Primary Examiner* — Susan McFadden

(74) *Attorney, Agent, or Firm* — Connolly Bove Lodge & Hutz LLP

(57) ABSTRACT

A process for distributing digital audio sequences according to a nominal flux format including a succession of fields, each of which includes at least one digital block clusterizing a selected number of coefficients corresponding to single audio elements that are digitally coded inside the flux and utilized by audio decoders that are able to play it to be able to decode it correctly, including a preparatory step including modifying at least one of the coefficients, and a transmission step including a primary flux in compliance with a nominal format including blocks that were modified during the preparatory step and by a route separated from the primary flux by an additional piece of digital information which allows reconstruction of the original flux starting with a calculation, on recipient equipment, as a function of the primary flux and of the additional information.

20 Claims, 1 Drawing Sheet

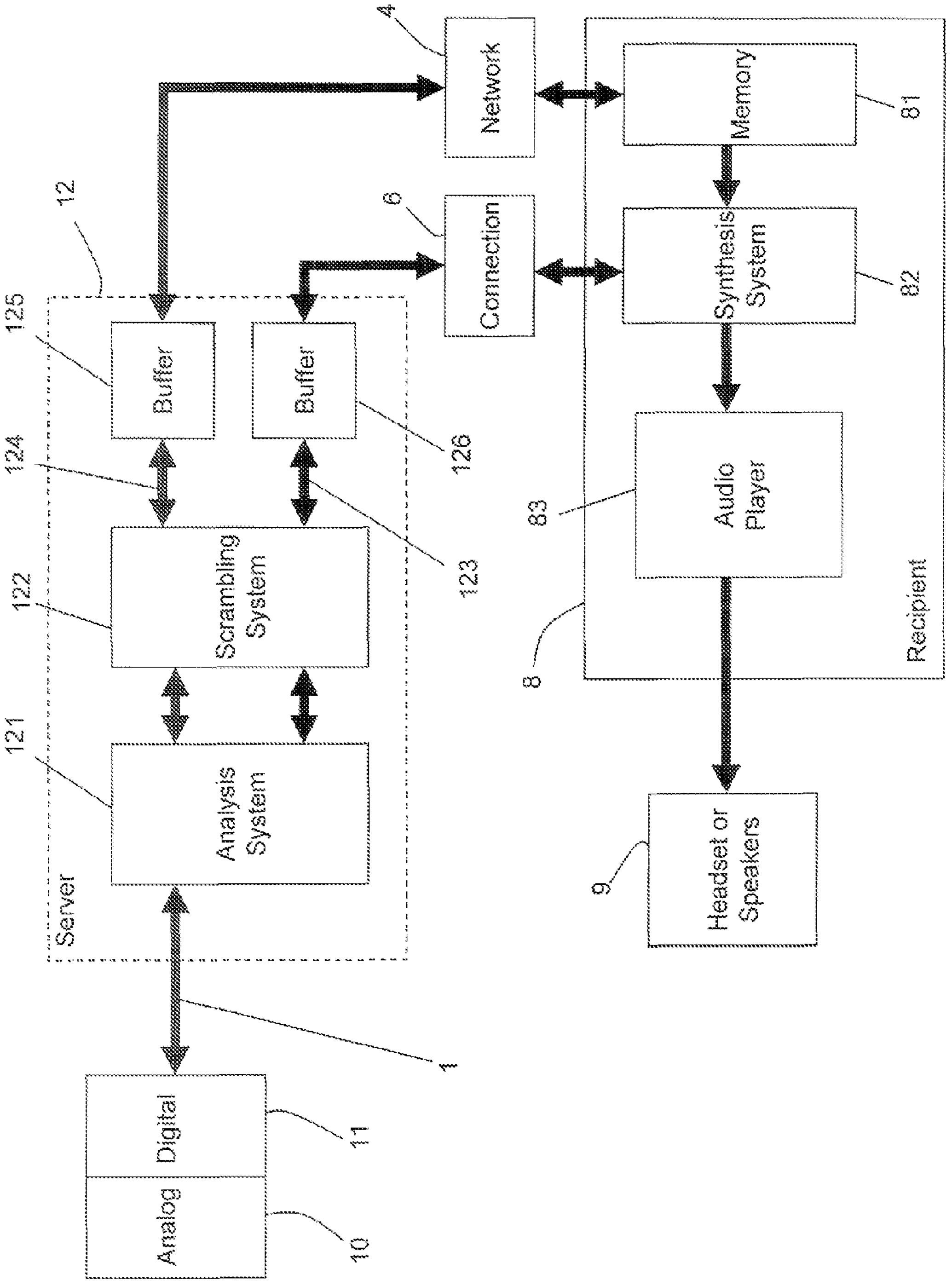
Analog
10
Digital
11
1
Server
12
Analysis System
121
Scrambling System
122
123
124
Buffer
125
Buffer
126
Network
4
Connection
6
Memory
81
Synthesis System
82
Audio Player
83
Recipient
8
Headset or Speakers
9

SECURE AUDIO STREAM SCRAMBLE SYSTEM

RELATED APPLICATION

This application is a continuation application of U.S. patent application Ser. No. 11/092,533, filed Mar. 29, 2005, which is a continuation application of International Application No. PCT/FR2003/002913, with an international filing date of Oct. 3, 2003 (WO 2004/032418, published Apr. 15, 2004), which is based on French Patent Application No. 02/12267, filed Oct. 3, 2002, the entire contents of which are incorporated herein in their entirety.

FIELD OF THE INVENTION

This invention relates to the domain of processing digital audio flux. More specifically, this invention relates to a device that is capable of securely transmitting a set of audio fluxes of high auditory quality to a music or speech player so that it is recorded in the memory or on the hard disk of an enclosure connecting the teletransmission network to the audio or television player, while at the same time preserving the auditory quality but avoiding fraudulent utilization such as making pirated copies of the audio programs recorded in the memory or on the decoder enclosure's hard disk.

BACKGROUND

Audio signals can possess one or more components: speech, music, noise, natural sounds, synthetic sounds and/or any audio signal with the same characteristics, components which are digitally processed in view of the various digital multimedia applications, such as for example digital television, DVD's, records, music CD's, Internet services, interactive multimedia services. There are a great many mathematical methods for processing the audio signal. It is customary to use frequency and temporal transformations, prediction or statistical algorithms, mechanisms for producing sound and speech, acoustic analysis and mechanisms using the ear's properties of perception.

For example, the speech coders are based on its statistical characteristics, such as variance and auto correlation, which give rise to predictive and adaptive algorithms, likewise on its spectral properties (pitch (relative to fundamental), formants (related to the spectral enclosure), voicing, non-voicing). Numerous algorithms likewise exist in the frequency, temporal, parametric, and analysis and synthesis coding domains.

For various digital applications, more and more reliable modeling, quantification, compression and transmission means have been perfected and have given rise to many audio coders with better and better performance in terms of quality, compression, cost and reliability. For example, the MPEG-AAC (Motion Picture Expert Group-Advance Audio Coding) is currently considered to be the standard in compression of Hi-Fi band audio signals compression that is most efficient and most universal. Nevertheless, as more and more multimedia applications are offered on the market, they are also very often pirated.

From prior practice we already know about a security system for portable music players, through WO 0058963 (Liquid Audio). Data such as a musical piece are saved both as a portable secured piece (SPT: secure portable track), which could be connected to one or more readers ("players") and could be connected to a specific means of data backup, thus restricting playing the SPT to specific players and ensuring that playing takes place only from the original means of backup. The SPT is connected to a player by encrypting of SPT data by using a backup key which is unique to the player, difficult to change and is kept by the player under strict security conditions. The SPT is connected to a specific means of backup by including data that uniquely identifies the backup means in a form that is resistant to falsification, i.e. signed in an encrypted manner.

U.S. Pat. No. 4,600,941 (Sony) discloses a scrambling system for audio signals in which an audio signal is divided into blocks, where each block consists of multiple fields, where the multiple fields are rearranged on a time base in a n order that is predetermined for each block such that they are encoded and the encoded signal is re-arranged on a time basis in an original order such that it can be decoded, in which a first signal processing circuit is provided for inserting a redundant portion into a portion between contiguous fields and compress the fields in base time in response to the redundant portions during encoding, where a circuit generates a signal for inserting a monitoring signal other than a piece of audio information into the redundant portions, a signal monitoring detection circuit for detecting the monitoring signal during decoding and a second circuit for processing the signal for removing the redundant portions in synchrony with the detected monitoring signal and decompressing the fields in base time in response to the redundant portions.

U.S. Pat. No. 5,058,159 (Macrovision Corporation) discloses a means and a system for scrambling and unscrambling audio information signals. The audio signals are scrambled by inversing the original frequency specter such that the portions of the frequency that originate below in the audio frequency band are shifted upwards whereas the portions originating above the band are shifted downwards. A pilot sound of known frequency is recorded with the audio signals at the shifted frequencies. During reproduction, each phase and frequency variation is sought out by the pilot sound, which is used to generate the demodulation signal to reconstitute the original frequency content of the audio signals.

WO 00 55089 A discloses a means and a system for scrambling digital samples which may or may not be compressed, representing audio and video data, such that the contents of these samples are degraded, but recognizable, or otherwise provided with a required given quality. A given number of LSBs ("Least Significant Bits", lightest weight bits) data are scrambled for each sample field by field, in an adaptive manner as a function of the dynamic of possible values, where the highest weight bits are unchanged. This solution represents an encrypting solution that is well known to the craftsman, using (an) encrypting key(s). The encrypting keys are transmitted all at once or entirely in the flux with the encrypted data, which makes the flux vulnerable to attempts at pirating, given that all the elements comprising the audiovisual flux remain inside the flux. However, it does not provide the desired high security.

DE 199 07 964 C discloses a device used to generate an encrypted data flux which represents an audio and/or video signal. This prior art develops means and techniques for protecting the audio (and/or video) flux by modifying, using one or more keys, certain information in the original flux, for example encrypting is carried out by modifying the LSB's ("Least Significant Bits", lightest weight bits) of the spectral coefficients.

Given that protection is carried out using encrypting keys, all the initial information remains present inside the protected flux. However, it too does not provide the high security criteria.

The state of the art gives proof of many audio flux protection systems, which are essentially based on encryption of data, by adding encrypting keys that are independent of the audio flux content, and which therefore modify the format of the structured flux. A specific and different embodiment is that of the Coding Technologies company, which consists of using scrambling to protect a selected part of the bitstream ("bitstream" is the name for the binary flux at the output of the audio encoder) and not the entire bitstream. The protected parts represent the spectral values of the audio signal, which means that during decoding without unencrypting, the audio flux is distorted and unpleasant to listen to.

It would therefore be advantageous to provide a means that makes reconstitution of a modified audio flux impossible to ensure audio protection of any broadcast system whatsoever (audio or audiovisual).

SUMMARY OF THE INVENTION

This invention relates to a process for distributing digital audio sequences according to a nominal flux format including a succession of fields, each of which includes at least one digital block clusterizing a selected number of coefficients corresponding to single audio elements that are digitally coded inside the flux and utilized by audio decoders that are able to play it to be able to decode it correctly, including a preparatory step including modifying at least one of the coefficients, and a transmission step including a primary flux in compliance with a nominal format including blocks that were modified during the preparatory step and by a route separated from the primary flux by an additional piece of digital information which allows reconstruction of the original flux starting with a calculation, on recipient equipment, as a function of the primary flux and of the additional information.

This invention also relates to a process for restoring digital audio sequences encoded according to a process for distributing digital audio sequences, including decoding a primary flux by applying a reconstruction function using the additional information originating from a route separate from the vector of the primary flux, and decoding the flux reconstructed by a process adapted to the nominal format.

This invention further relates to a system for distributing digital audio sequences according to a nominal flux format including an encoder according to a nominal format and a transmitter that transmits a digital flux, a means of processing an original flux that modifies at least one coefficient of the primary flux, and a means for transferring additional information corresponding to the modification.

This invention still further relates to equipment for restoring digital audio sequences according to a nominal flux format, including a decoder according to the nominal format, a means of receiving a digital flux, a means of receiving an additional piece of information associated with the primary flux, and a means for reconstructing the original flux by processing the primary flux and the additional pieces of information.

BRIEF DESCRIPTION OF THE DRAWING

The invention will be better understood using the description, which is given below solely for explanatory purposes, of one manner of embodiment of the invention, in reference to the attached drawing:

the Drawing shows a particular manner of embodiment of the client-server system in compliance with the invention.

DETAILED DESCRIPTION

This invention involves a process for distributing digital audio sequences according to a nominal flux format consisting of a succession of fields, each of which comprises at least one digital block that clusterizes a certain number of coefficients corresponding to single audio elements that are digitally coded according to a specified manner inside the flux involved and used by all audio decoders that are capable of restoring or playing it to be able to decode it correctly. This process comprises:

one preparatory stage comprising modifying at least one of the coefficients, a transmission stage comprising:

one primary flux in compliance with the nominal format, including the blocks modified during the preparatory stage, and by a route separated from the primary flux by an additional digital information allowing the original flux to be reconstituted from calculation, on the recipient equipment, as a function of the primary flux and of the additional information. The additional information is defined as a set consisting of data (for example, coefficients describing the original digital flux or extracts from the original flux) and functions (for example, the substitution or transposition function). A function is defined as containing at least one instruction that establishes a relationship between data and operators. The additional information describes the operations to be carried out to recover the original flux using the modified flux.

The term "scrambling" means the modification of a digital audio flux using appropriate means such that this flux remains in compliance with the standard with which it was digitally encoded, all the while making it playable with an audio player, but altered from the point of view of human auditory perception.

The term "unscrambling" means the process of restoring using appropriate means of the initial flux, where the restored audio flux after the unscrambling is identical to the initial audio flux.

This invention provides the protection of the audio flux based integrally on the bitstream structure of the audio flux, a protection that comprises modifying the targeted portions of the bitstream that relate to modeling and which are characteristic of the audio flux. The true values are extracted from the bitstream and stored as additional information, and in their place random, calculated or transposed values are placed, for the entire audio flux. In this way, "decoys" are added for the decoder, which receives, upon input, an audio flux that is completely in compliance with the original audio format, but which is not acceptable from the auditory point of view of a human being.

Inversely to most encrypting systems already known in the art, the principle described below allows us to ensure a high level of protection while reducing the volume of information required for decoding. Protection, conducted in compliance with the invention, is based on the principle of suppression and replacement of information describing the audio signal with any means whatsoever, those being: substitution, modification or shifting of information. This protection is likewise based on the knowledge of the structure of the flux at the output of the audio encoder: scrambling depends on the contents of the digital audio flux. Reconstitution of the original flux takes place on the recipient equipment starting from the modified principal flux which is already present on the recipient equipment and additional information sent in real time comprising data and functions executed with the help of digital routines (a set of instructions).

Once the manner in which modeling is carried out is known, compression and encoding of the audio signal for the audio coder and/or the usual or given standard, it is still possible using the bitstream to extract the primary parameters that describe it and which are sent to the decoder.

Once these parameters have been identified, they are modified in such a way that the audio flux generated by the coder and/or the given standard is in compliance with this coder and/or standard. Moreover, the modification ensures stability of the sound signal, but makes it unusable by the user, because it is scrambled. Nevertheless, it can be compared and interpreted in the decoder that corresponds to its encoding and played by a player without the latter being disturbed.

Changing one or more of the components of the audio signal (spectral enclosure, fundamental or harmonic, psychoacoustic model, temporal development, Signal/Noise ratio, composition, compression, quantification, transformation) will cause its degradation from the auditory point of view and transform it into a signal that is completely incomprehensible and unpleasant from the subjective auditory perception point of view. The part of the audio signal or component describing it which will be modified depends on its encoding, for each given coder/decode, and this whether it is for speech, music, noise or special effects, or any audio signal of the same type. Depending on the manner in which the encoding and transmission of the resulting parameters will be carried out, we can get direct or indirect information on the primary characteristics of the audio signal and therefore change them. This principle is applicable for all types of audio coders whether they are part of a concrete type or standard or not, as well as for all their layers, base or improvement (base and enhancement layers) or a combination of the two.

To this end, the invention involves, in its most general acceptance, a process for distributing digital audio sequences according to a nominal flux format consisting of a succession of fields each one of which comprises at least one digital block that clusterizes a certain number of coefficients corresponding to simple digitally coded audio elements according to a means specified inside the flux involved and used by all the audio decoders that are capable of playing it to be able to decode it correctly, distinguished by the fact that it comprises:

a preparatory stage comprising modifying at least one of the said coefficients, a transmission stage comprising:

- a primary flux in compliance with the nominal format, consisting of the blocks changed during the preparatory stage, and
- by a separate route in this the primary flux of additional digital information that allows reconstitution of the original audio flux starting from the calculation, on the recipient equipment, as a function of the primary flux and of the additional information.

According to one aspect, the primary modified flux is recorded on the recipient equipment prior to the transmission of the additional information on the recipient equipment. According to another variation, the primary modified flux and the additional information are transmitted together in real time. Preferably, the change in the original flux is applied to at least one structured digital audio field. Advantageously, the changes are made so that the primary modified flux is of the same size as the original digital flux. Advantageously, the nominal flux format is defined by a standard or coder that is common to a user community.

According to another aspect, the process comprises an analysis stage for at least one part of the original flux, where the analysis stage determines the nature of the modifications of the coefficients. According to another variation, the analysis stage determines the change of the coefficients by taking into consideration the concrete structure of at least one part of the original flux. Advantageously, the change is applied to at least one primary scale factor of at least one field. Advantageously, the modification is applied to at least one spectral coefficient of at least one field.

Preferably, the process described previously comprises a prior analog/digital conversion stage in a structured format, where the procedure is applied to an analog audio signal.

According to a specific means of implementation, the flux comprises at least one audio field structured according to the MPEG-2 layer 3 format (MP3), or AAC (Advanced Audio Coding), or CELP (Code Excited Linear Prediction), or HVXC (Harmonic Vector eXcitation Coding), or HILN (Harmonic and Individual Lines plus Noise), or AC-3 (Advanced Coding-3). Preferably, the additional modification information comprises at least one digital routine likely to execute a function. Advantageously, the additional modification information is subdivided into at least two sub-parts. According to one variation, said sub-parts of additional modification information can be distributed using different media. According to another variation, the sub-parts of additional modification information can be distributed by the same media.

Advantageously, the additional information is transmitted using a physical vector. According to one variation, the additional information is transmitted online.

Preferably, decoding of a primary flux occurs by application of a reconstruction function starting with additional information originating from a route separate from the primary flux vector, and with a decoding of said flux reconstructed by a process adapted to the nominal format. Preferably, the flux, reconstituted starting from the primary modified flux and the additional information is strictly identical to the original flux.

The invention likewise involves a system for distributing digital audio sequences according to a nominal flux format, for implementing the process described previously, comprising an encoder according to the nominal format and the means of transmission of a digital flux, distinguished by the fact that it comprises a means for the processing of an original flux consisting of modifying at least one coefficient of the principal flux, where the server comprises a means for transferring the additional information corresponding to the modification.

The invention also involves a piece of equipment for restoring digital audio sequences according to a nominal flux format, for implementing the process described previously, comprising a decoder according to the nominal format, and means of receiving a digital flux, distinguished by the fact that it comprises a means of receiving additional information associated with the primary flux and a means of reconstructing the original flux by processing of the primary flux and of the additional information.

Turning now to one example of one aspect of the system, the Drawing shows a client-server system in accordance with the invention.

The audio flux of the MPEG-2 layer 3 type (also called MP3) (1) is passed to a system of analysis (121) and scrambling (122) that generates a modified primary flux and additional information. The original flux (1) can be directly in digital format (10) or analog format (11). In the latter case, the analog flux (11) is converted by a coder, not shown, into a digital format (10). In the text that follows, reference number "(I)" denotes the digital audio input flux.

A primary flux (124) in the MPEG-2 layer 3 format, in a format identical to the digital input flux (1) outside of the fact that some of the coefficients, values and/or vectors have been modified, is placed inside an outlet buffer (125). The additional information (123), which may be in any format whatsoever, contains references to the parts of the audio samples that were modified and is placed into the buffer (126). As a function of the input flux characteristics (1), the analysis (121) and scrambling system (122) decides which scrambling to apply and which flux parameters to modify as a function of the audio coder type with which it was encoded (for example MPEG-2 layer 3, MP3Pro . . . or else AAC, CELP, HVXC, HILN, or their combinations if the flux processed is an MPEG-4 flux).

The MPEG-2 flux (125) is then transmitted, via a high flow network (4) of Hertzian, cable, satellite or the like to the recipient (8), and more precisely in its memory (81) of RAM, ROM or hard disk type. When the recipient (8) makes the request to listen to an audio sequence present in the memory (81), two eventualities are possible:

either, the recipient (8) does not have the rights necessary for listening to the audio sequence. In this case, the flux (125) generated by the scrambling system (122) present in its memory (81) is passed to the synthesis system (82), which does not modify it and which transmits it identically to a standard audio player (83) and its contents, greatly degraded from an auditory standpoint, is played by the player (83) on the loudspeakers or headset (9), or the recipient (8) has the rights to listen to the audio sequence. As a function of the user's rights, the server 12 transmits the additional appropriate information (126) through connection (6), in whole or in part. In this case, the synthesis system makes an audition request to server (12) that contains the information (126) necessary for recovery of the original audio sequence (1). The server (12) then sends through connection (6) using telecommunication networks (6) of the following types: analog or digital telephone line, DSL (Digital Subscriber Line), BLR (Boucle Locale Radio [Local Radio Loop]), DAB (Digital Audio Broadcasting) or digital mobile telecommunications (GSM, GPRS, UMTS) where additional information (126) allows the restoration of the audio sequence such that the recipient (8) can listen to and/or store the audio sequence. The synthesis system (82) then proceeds with unscrambling the audio through the reconstruction of the original flux by combining the primary modified flux (125) and the additional information (126). The audio flux obtained at the synthesis system output (82) is then transmitted to the standard audio player (83) which broadcasts the original audio onto a headset or loudspeakers (9).

More specifically, this invention concentrates on the analysis module (121) and scrambling module (122), given the great multitude of audio coders.

Examples of one possible embodiment of module 12:

Concerning encoding with CELP (Code Excited Linear Prediction) included in the MPEG-4 standard, the parameters distinguishing the audio signal are extracted and encoded using an entropic coding in the bitstream. The audio characteristics such as indices in LPC (Linear Predictive Coding) coefficients, the time period (lag) (for the adaptive codebook), the excitation index (for the codebook, or table of set values), the earnings index and the like are transmitted using the bitstream to the decoder for reconstructing the signal. The LPC coefficients are transformed into LAR (Log Area Ratio) and then encoded with Huffman codes. When one or more LPC coefficient index values, or gains and index, are modified (for example, by substituting with any different value or calculated, by bit inversion, cancellation or transposition), the constitution of the audio signal and damage the spectral model is modified. Since the bitstream (corresponding to the generated flux (124)) is in compliance it is correctly decoded, but the decoded audio sequence is deteriorated relative to the original sequence, and is therefore unpleasant to the human ear or not audible.

The principle remains the same for all of the following examples, with the difference that it is applied to different parameters of the audio signal emanating from the modeling, the mathematical transformations, quantification or compression, in relation to the given audio encoder-decoder. The audio signal parameters to be modified for each encoder are given as an example, as the invention is not limited either to the parameters or encoders indicated.

Advantageously, for each example, each substitution value is of the same size as the value substituted. Advantageously, for each example, the size of the primary modified flux is identical to the size of the original flux.

With the MPEG-2 layer 3 (or MP3) coder, it is possible to obtain the characteristics of the audio signal after treatment by filter banks in the form of spectral lines, which are quantified by a scale factor technique and transformed into MDCT (Modified Direct Cosine Transform), then quantified and subsequently encoded using Huffman encoding. By modifying the Huffman codes relative to the MDCT coefficient values, or the quantification scale factors, or by modifying the prediction coefficients for multi-channel coding, significant deterioration of the audio signal occurs.

The MPEG-2 layer 3 bitstream is constituted in the following manner: heading, CRC (Check Redundancy Code), side information (containing the parameters related to encoding) and Main Data, where Main Data contains the scale factors, Huffman codes and additional data which represents the multi-channel extension (which in its turn contains a similar structure, namely also comprising scale factors, prediction coefficients and Huffman codes representing the MDCT (Modified Direct Cosine Transform) spectral line coefficients for the multi-channel layer. One example of modification for the multi-channel layer is to extract a given value for scale factors or prediction coefficients and replace them with a random or set value calculated so that it respects the compliance and size of the audio flux. In this case, during decoding, the decoder will reconstruct the audio flux with one or more values that do not correspond to its actual characteristics. Changing the scale factors augments the quantification noise. Another possibility is to transpose the Huffman coefficients relative to the quantified MDCT coefficients. For example, in the "big_values" partition, the values are directly coded using Huffman tables in absolute values and in pairs, as follows:

hcod[|x|][|y|] is the Huffman code for values x and y, hlen[|x|][|y|] is the Huffman code length for values x and y.

If one or two of the values x and y are different from zero, one or two sign bits are added to them. A transposition is carried out between values x and y at the level of parameters hcod and hlen, the transposition results in inverting the lightest-weight and heaviest-weight bits of hcod and hlen. The sign bit can also be inverted. Another possibility is to substitute the value hcod[|x|][|y|] with a value belonging to the same Huffman table and of length hlen[|x|][|y|]. These modifications and the modification of the prediction coefficients change the spectral composition of the audio signal, the audio signal is deformed.

The HVXC (Harmonic Vector eXcitation Coding) encoder for speech and the HILN (Harmonic and Individual Lines plus Noise) encoder (MPEG-4 standard) for music are parametric encoders that code the audio signal separately or jointly as a function of its contents. For example, the bitstream emanating from the HVXC contains LSP (Line Spectral Pairs) values that reflect the LPC parameters. The LSP's are vectorially quantified, stabilized in the lsp_current[ ] value in order to ensure the stability of the LPC synthesis filter and then lined up in a bitstream in ascending order, with a minimum distance between adjacent coefficients. Trans-posing or modifying two coefficients, for example, in the bitstream, results in deforming the spectral enclosure.

The Dolby AC-3 (Advanced Coding) coder carries out the time-frequency audio signal transformation and the spectral enclosure is represented in exponential form. A special procedure determines how many bits are allocated for the representation of mantissas, which are quantified as a consequence. Since it is known that the arrangement of these elements in the bitstream consists of several audio blocks containing information on the dithering (digital processing whose purpose is to obtain better approximation of a digital audio signal by adding a low-amplitude random signal), coupling, exponents, allocation of bits, mantissas, the exponent values are encoded differentially and by modifying these values very little, the entire block can be corrupted, and subsequently the blocks that follow it. The mantissas are encoded absolutely, and it suffices also to modify, substitute or transpose the values to corrupt the spectral enclosure.

The MPEG-AAC encoder is based on the time-frequency transformations and also generates scaling and quantification, parameters, TNS (Time Noise Shaping) parameters, TLP (Long Time Prediction) parameters, modifying these values likewise produces auditory transposition effects. For example, the MDCT coefficient vectors are flattened by division with the LPC spectral enclosure (transformed into LST and sent to the decoder in the form of indices). Weighting vectors are divided into sub-vectors, which are submitted to a weighted vectorial quantification, and the resulting indices are also sent to the decoder. In the case of a vectorial quantification of the MDCT's the VQ's (Quantification Vectors) that are not uniform are designated by their index in the given codebook. The MDCT are interlaced before being vectorially quantified. By modifying the quantification vector index, or the LSP indices, it is possible to modify the spectral values and reverberates the error onto other values, subsequent to this interlacement.

In the bitstream, the spectral values are arranged in the following manner:

X [g] [win] [sfb] [bin] where g indicates the group, win indicates the spectral window used, sfb indicates the scale factor and bin indicates the coefficient. For each group, the scale factor is applied to all the coefficients in the group and reduces the quantification noise. The bit-stream elements for the scale factors are global_gain, scale_factor_data, hcod_sf[ ]. Global-gain represents the first scale factor and the starting point for the scale factors that follow it and are encoded differentially relative to the previous one using Huffman standards tables. If the value of global_gain is directly modified, or by replacing it with a random or calculated value, the scale factors that follow will be corrupted and the audio signal will be damaged. This modification can be carried out for one, several groups, or for all of them, and this at least for one granule and for at least one field. Global_gain is encoded over 8 bits in the binary flux, for example, by inverting the sixth heavyweight bit, given that the scale factors are coded differentially relative to global_gain, the signal is completely distorted and incomprehensible. Modifying the fourth lightweight bit results in producing lighter protection, the audio flux is comprehensible, but very unpleasant to listen to.

As was just illustrated, by a very small change of information in the flux, the audio signal is significantly destroyed, while obtaining good protection for additional information of very small size. Advantageously, adjustments are defined for the scrambling module, such that the maximum authorized values are respected to guarantee that the protected audio flux is not dangerous to human hearing. For example, the scrambling module does not modify the two heaviest-weight bits in global_gain, to avoid significant sound peaks. Advantageously, the two heaviest-weight bits in global_gain are substituted with zeros, which partially attenuates the signal and makes it less comprehensible.

In the case where the spectral values are encoded in quadruplets (in increasing order of frequency), two values can be transposed and damage the spectral composition: hcod sect_cd[g] [i] [w] [x] [y] [z], these are Huffman codes for the i section of the g group. The transposition expands to invert the lowest-weight bits with the heaviest-weight bits. Another possibility is to substitute the value of sect_cg[g] [i] [w] [x] [y] [z] with a value belonging to the same Huffman table and of identical length.

If prediction is activated, this is indicated in the bitstream by a predictor_data_present flag. The rear prediction, based on the spectral redundancy of the signal, is conducted using a lattice structure, of which each element x is predicted using the two preceding elements. A predictor_reset flag indicates for which field the prediction is being reinitialized. In this way, by damaging this flag, the reconstitution of the predicted samples can be disturbed, by modifying the initial value or by indicating an incorrect initialization. It is enough to modify several values x in the field in order to damage the prediction of the subsequent samples.

In the AAC, the LTP prediction (Long Term Prediction) can be used, which is a prediction before the fact, where the prediction coefficients are sent in the Side Information part of the bitstream, and therefore we can modify or replace the ltp_lag value (the delay) or modify the coefficient indication ltp coef which takes the values attributed by a chart.

TNS (Temporal Noise Shaping) is used to monitor the temporal shape of the quantification noise in each spectral window, and represents one of the most powerful tools in AAC. The order and coefficients of the filter are calculated for each band and transmitted to the decoder in the same way as the LPC coefficients. Modifying or replacing these values will greatly deteriorate the audio signal.

The examples cited illustrate the principle of modifications on a digital audio flux with the goal of protecting it and are applicable to all fluxes that have similar characteristics.

The invention claimed is:

1. A process for distributing digital audio sequences of an original flux, comprising:

modifying, at a server, at least one coefficient in a field of the original flux;

transmitting, by the server, a primary flux comprising blocks that were modified; and separately transmitting, from the server, additional information including original blocks of the primary flux that were modified and one or more functions allowing for reconstruction of the original flux, on recipient equipment, as a function of the primary flux and of the additional information.

2. The process according to claim 1, wherein the digital audio sequences are distributed according to a nominal flux format comprising a succession of fields and wherein the primary flux is transmitted in compliance with the nominal flux format.

3. The process according to claim 2, wherein a selected number of coefficients corresponding to a single audio element that is digitally coded inside the flux is clustered in at least one digital block of each field.

4. The process according to claim 1, wherein the additional information is transmitted in real time.

5. The process according to claim 1, wherein the modifying comprises scrambling targeted portions of a bitstream structure of an audio flux, the targeted portions of the bitstream relate to modeling and are characteristic of the audio flux, and wherein the modification ensures stability of a sound signal but makes the primary flux unusable.

6. The process according to claim 1, wherein the modification is dependent on the encoding of the digital audio sequences and on the type of the digital audio sequences.

7. The process according to claim 1, wherein the additional information is transmitted after the primary flux is recorded on recipient equipment.

8. The process according to claim 1, wherein the modifying comprises taking into consideration a concrete structure of at least one part of the original flux and applying a change to at least one primary scale factor of at least one field.

9. The process according to claim 1, wherein the modifying comprises taking into consideration a concrete structure of at least one part of the original flux and applying a change to at least one spectral coefficient of at least one field.

10. The process according toy claim 1, wherein the additional information comprises a first sub-part including the original blocks of the primary flux that were modified and a second sub-part including functions allowing for reconstruction of the original flux.

11. The process according to claim 10, wherein the transmitting additional information comprises transmitting the first and second sub-parts of the additional information with different media.

12. The process according to claim 10, wherein the transmitting additional information comprises transmitting the additional information using at least one of a physical vector or online transmission of the additional information.

13. The process according to claim 1, wherein the modifications are carried out such that the modified primary flux is of the same size as the original flux.

14. The process according to claim 1, wherein the original flux comprises at least one audio field that is structured according to one of the compression formats comprising an MPEG-2 layer 3, AAC, CELP ; HVXC, HILN and AC-3 formats:

15. The process according to claim 1, wherein the additional modification information comprises at least one digital routine designed to execute a function.

16. An apparatus for restoring digital audio sequences according to a nominal flux format, comprising:

recipient equipment including:

means for receiving a primary flux including modified blocks of an original flux and for receiving, via a separate transmission, additional information including original blocks of the original flux that were modified and one or more functions allowing for reconstruction of the original flux; and means for reconstructing the original flux as a function of the primary flux and the additional information.

17. The apparatus of claim 16, further comprising means for requesting the additional information after receipt of the primary flux and prior to reconstruction of the original flux.

18. The apparatus of claim 16, further comprising means for transmitting the reconstructed original flux to an audio player.

19. The apparatus of claim 16, wherein the means for receiving comprises memory means configured to store at least the primary flux.

20. The apparatus of claim 16, wherein the recipient equipment further includes at least one enclosure configured to enclose the means for receiving or the means for reconstructing or both.

* * * * *

UNITED STATES PATENT AND TRADEMARK OFFICE

CERTIFICATE OF CORRECTION

PATENT NO. : 8,200,498 B2
APPLICATION NO. : 12/628534
DATED : June 12, 2012
INVENTOR(S) : LeComte et al.

It is certified that error appears in the above-identified patent and that said Letters Patent is hereby corrected as shown below:

In the Specifications:

In Column 6, Line 45, delete “format,” and insert -- format --, therefor.

In Column 6, Line 61, delete ““(I)’”” and insert -- “(1)” --, therefor.

In Column 8, Line 29, delete “structure,” and insert -- structure), --, therefor.

In Column 9, Lines 20-21, delete “quantification,” and insert -- quantification --, therefor.

In the Claims:

In Column 11, Line 18, in Claim 10, delete “toy” and insert -- to --, therefor.

In Column 12, Line 4, in Claim 14, delete “CELP ;” and insert -- CELP, --, therefor.

In Column 12, Line 5, in Claim 14, delete “formats:” and insert -- formats. --, therefor.

Signed and Sealed this
Sixteenth Day of October, 2012

David J. Kappos
*Director of the United States Patent and Trademark Office*